United States Patent [19]
Parson et al.

[11] Patent Number: 4,513,918
[45] Date of Patent: Apr. 30, 1985

[54] DISPENSING APPARATUS

[75] Inventors: Roger F. Parson; Kenneth G. Rosenquist; Justin M. Schmit, all of Duluth, Minn.

[73] Assignee: Jeno's, Inc., Duluth, Minn.

[21] Appl. No.: 441,174

[22] Filed: Nov. 12, 1982

[51] Int. Cl.³ .............................................. B02C 19/12
[52] U.S. Cl. ................................. 241/101.4; 222/414; 241/225; 241/242; 241/280
[58] Field of Search ............... 241/222, 223, 224, 225, 241/241, 242, 243, 98, 205, 101.4, 280; 222/403, 423, 414, 342

[56] References Cited

U.S. PATENT DOCUMENTS

| Re. 10,579 | 4/1885 | Wegmann | 241/225 X |
| 1,826,891 | 10/1931 | Krogan | 241/225 |
| 3,545,689 | 12/1970 | Luscombe | 241/243 X |
| 3,606,099 | 9/1971 | Benson | 222/414 X |
| 3,620,423 | 11/1971 | Dalgleish | 222/414 |
| 3,837,586 | 9/1974 | Perschbacher et al. | 241/223 |
| 3,858,759 | 1/1975 | Lubenow | 222/414 X |
| 4,355,766 | 10/1982 | Wigand | 241/241 X |

FOREIGN PATENT DOCUMENTS

| 2152592 | 4/1973 | Fed. Rep. of Germany | 222/414 |
| 690456 | 9/1930 | France | 222/414 |
| 2039266 | 8/1980 | United Kingdom | 222/414 |

Primary Examiner—Mark Rosenbaum
Attorney, Agent, or Firm—Willian Brinks Olds Hofer Gilson & Lione Ltd.

[57] ABSTRACT

An apparatus for uniformly dispensing particulate food materials onto a moving article which comprises a hopper for holding a supply of the particulate and having a horizontally disposed orifice through which the particulate material can exit, a rotatable drum located below the orifice and having a plurality of spaced fins protruding radially therefrom and disposed on a zig-zag pattern and operable to counteract the tendency of the particulate material to fall off the drum, and a scraper adapted to engage the drum surface between the fins and operable to follow the zig-zag pattern of the fins to lift particulate material off the surface of the drum and guide it to a discharge precipice over which it falls onto the moving article.

8 Claims, 11 Drawing Figures

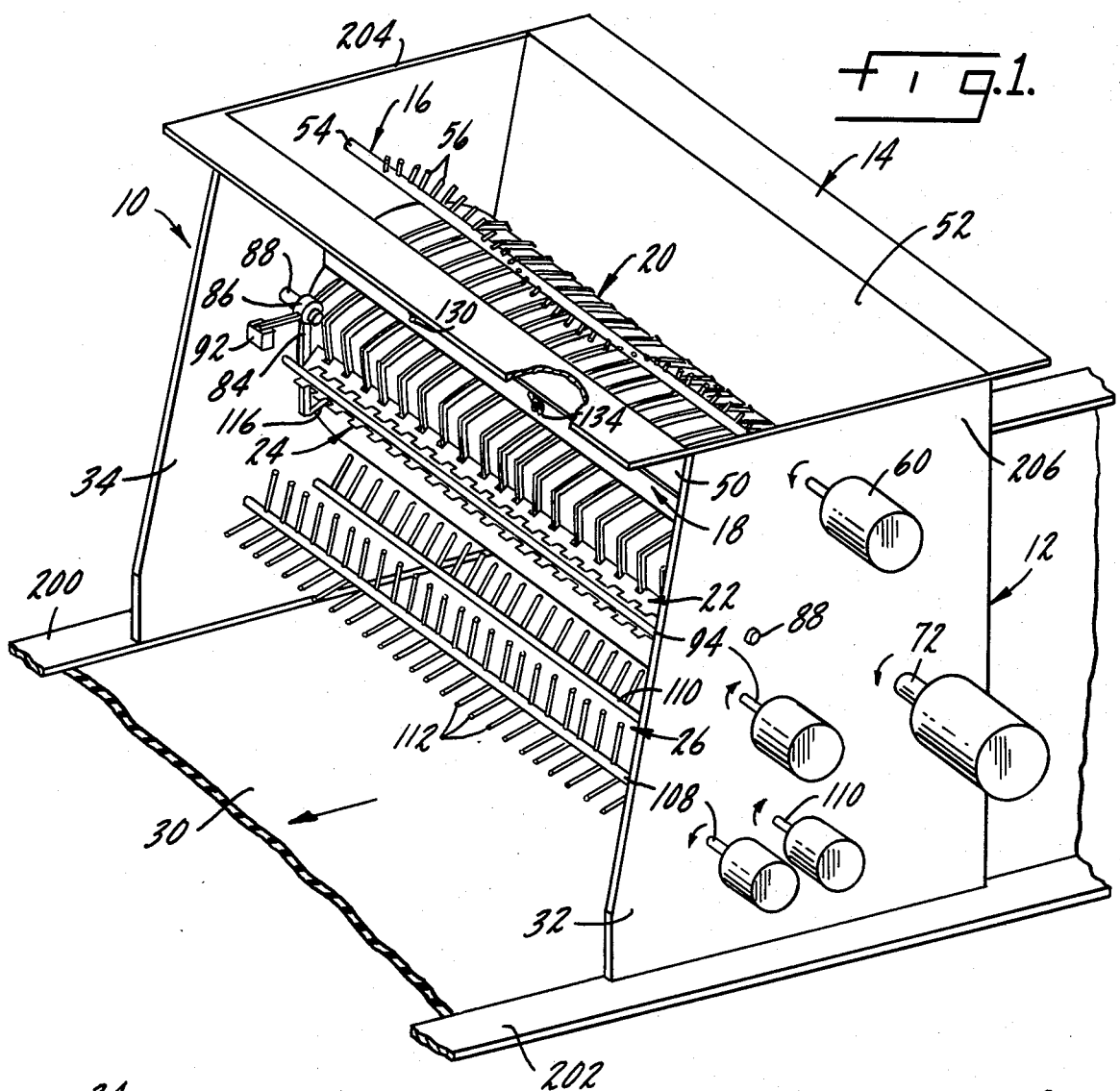
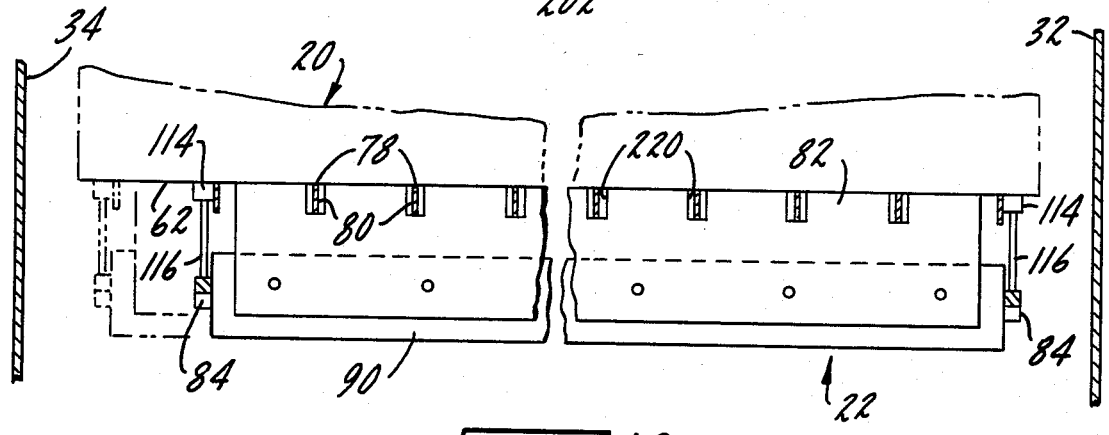

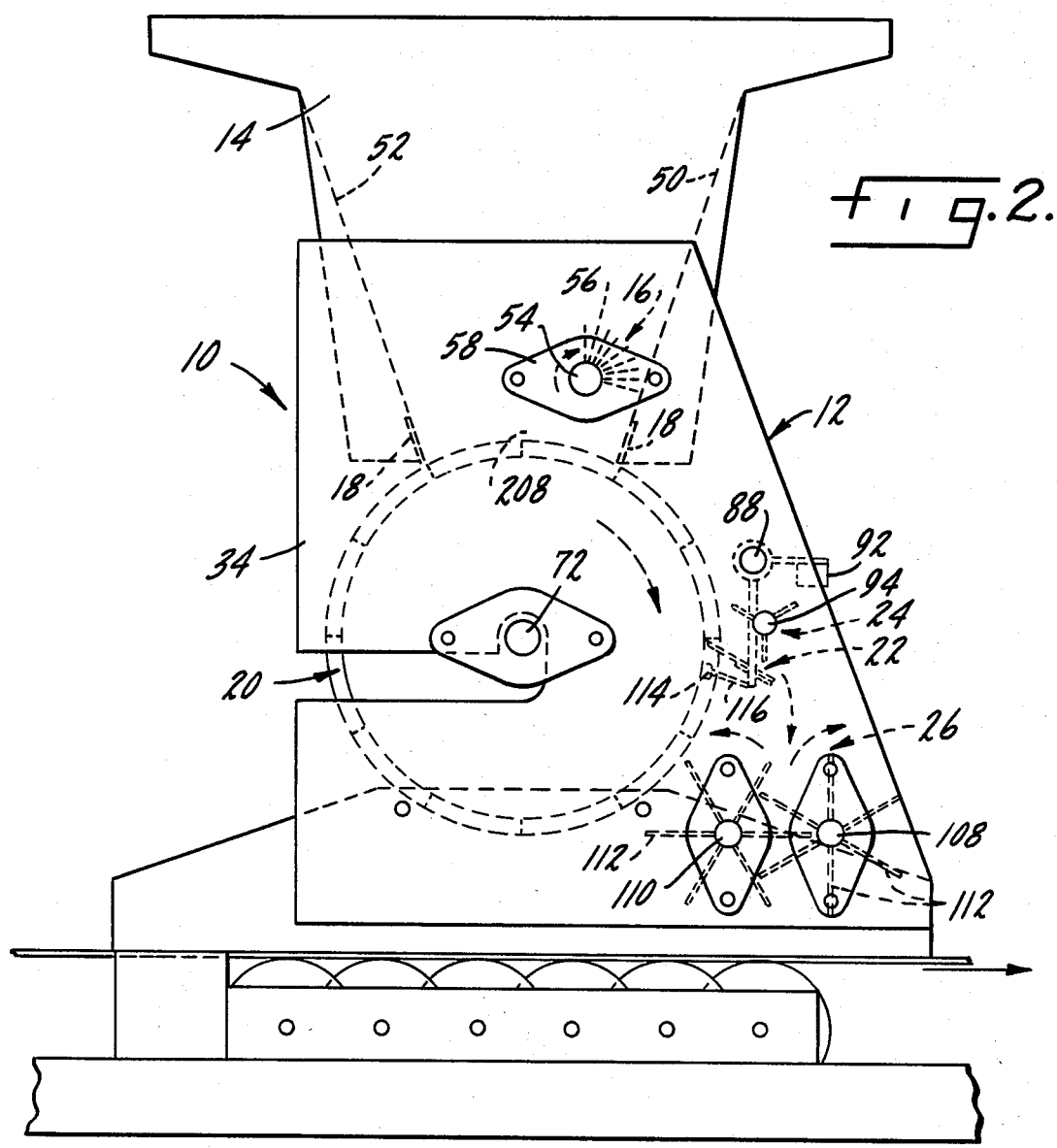
_fig.2._
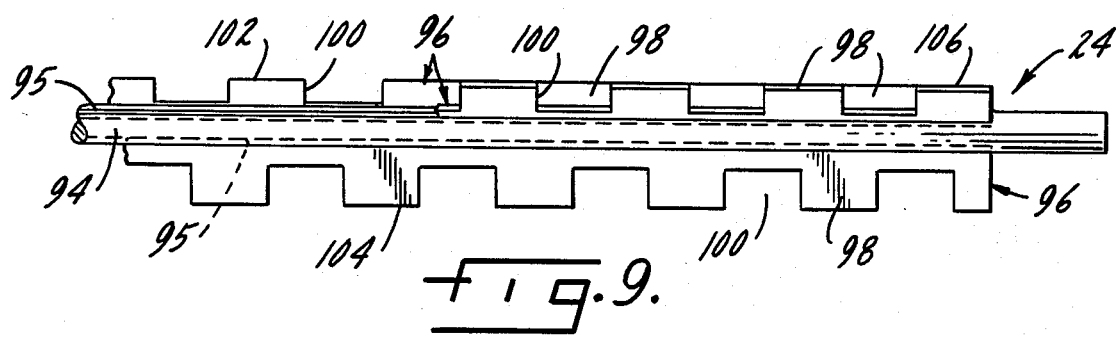
_fig.9._

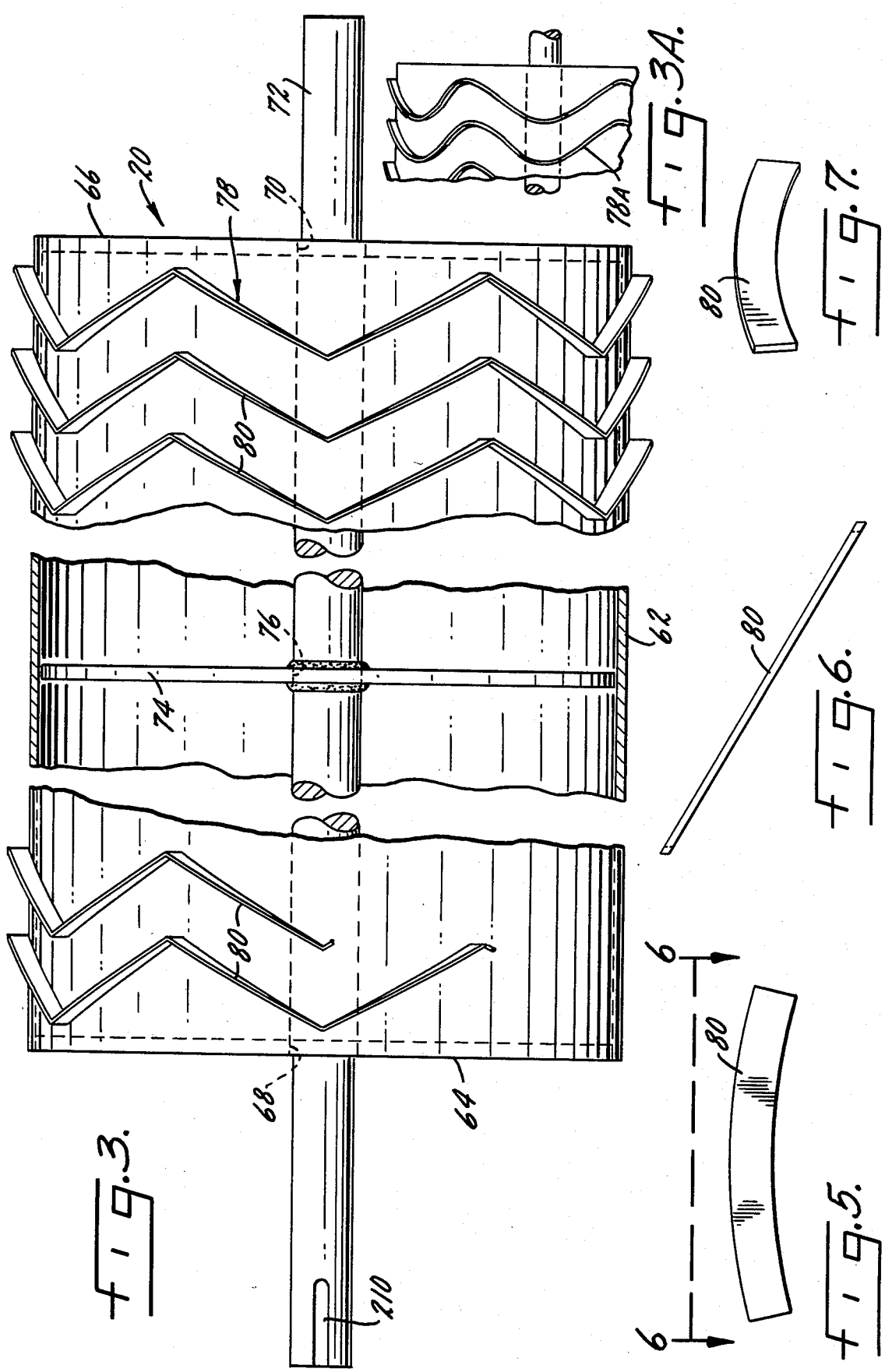

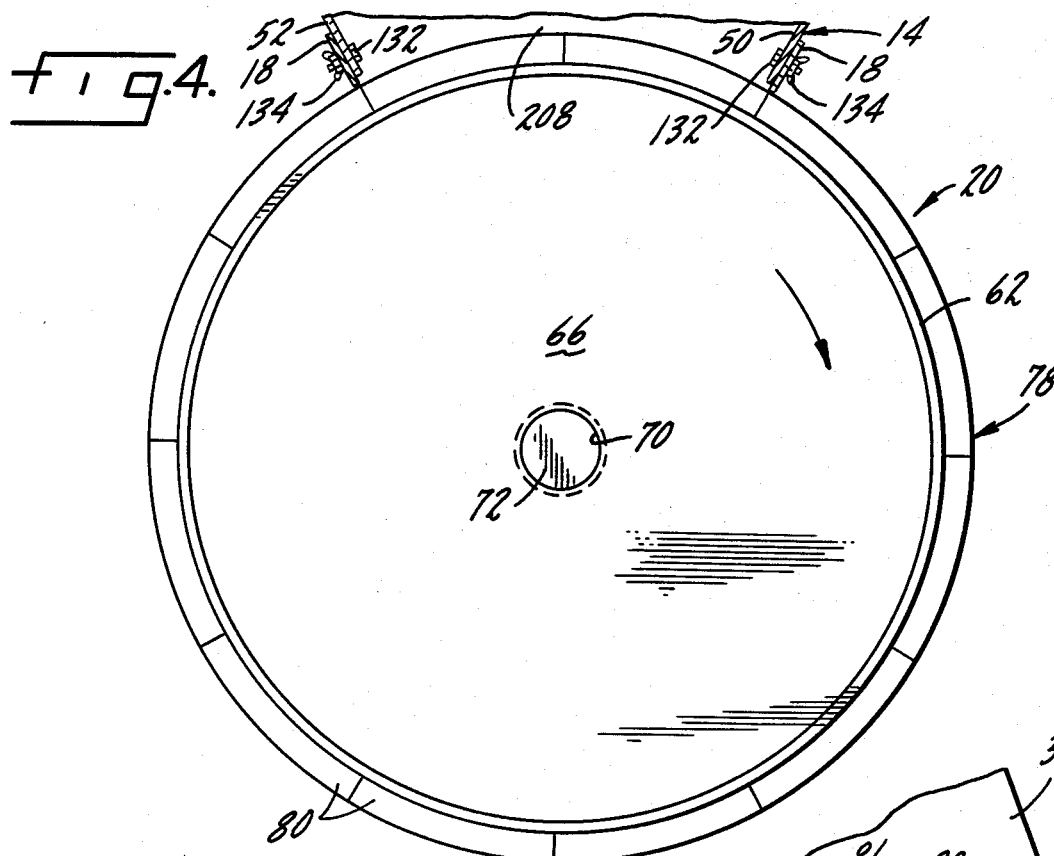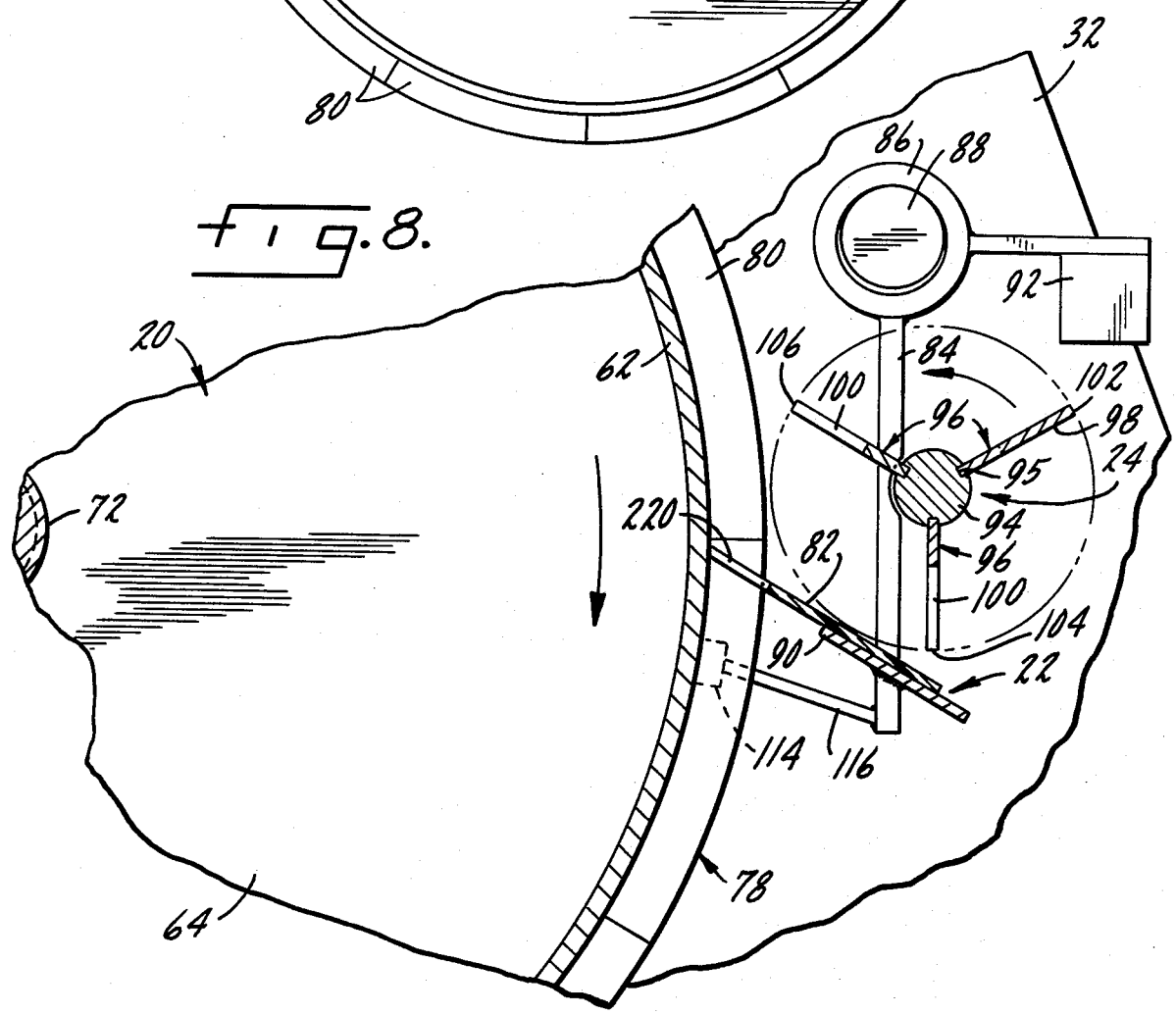

DISPENSING APPARATUS

FIELD OF THE INVENTION

This invention relates to distributing apparatuses generally, and more particularly, to a dispensing apparatus for evenly spreading food products on a surface.

BACKGROUND OF THE INVENTION

The production lines which assemble many commercially prepared food products often require a machine capable of evenly distributing small food items over a surface. For example, in assembling commercial, frozen pizzas, toppings such as sausage, mushrooms, pepperoni, peppers and cheese must be evenly placed on the pizza crust so that the pizza is evenly flavored and has an attractive and appetizing appearance. Also, in high speed commercial food assembly lines, an apparatus is needed which can quickly but accurately place a premeasured amount of food material on a specific surface.

One former method for distributing sausage or pepperoni on a pizza in commercial production was to sprinkle handfuls of cubed pepperoni or cooked ground sausage meat over the surface of the pizza.

Another apparatus used to distribute toppings on a pizza included a hopper with a gate which could be controlled. The hopper apparatus was set up over the production line, with the gate opening directly onto the assembly line. Inside the hopper were augurs, which could, in a rather crude way, regulate the amount of topping dispensed. Also, the hopper gate could regulate the amount and particle size of material flowing through the gate. This apparatus resembled a railroad coal hopper car, and was rather difficult to control.

Each of the methods had attendant disadvantages. As noted above, the hopper-gate apparatus was difficult to regulate and could not dispense accurate amounts of toppings. Also, distributing food material by hand is obviously labor intensive, inaccurate and inefficient. It is difficult to ascertain exactly how much material the operator is distributing on the pizza without first measuring or weighing the material. Weighing the material is time consuming, and it still does not guarantee that the material will be evenly distributed over the surface of the crust.

It is, accordingly, an object of the invention to develop an apparatus in which a topping may be distributed directly onto a pizza crust in a speedy and accurate way. Another object is to automate the distribution of toppings on pizza crusts. A still further object is to dispense accurately a selected amount of topping on the pizza crust. An additional object is to improve yields from toppings. Still another object is to develop an apparatus which can handle numerous different types of topping and dispense them accurately.

A further object is to provide a distribution apparatus using a rotating drum which can hold the topping between fins on the surface of the drum while the drum rotates. A still further object is to provide an apparatus which uses a scraper blade while following the drum fins. A variant object is to provide an apparatus with a nibbler assembly which breaks "ribbons" of food product into discrete clumps. Another object of the invention is to provide a dispenser which can unclump food chunks when desired. A still further object is to develop an apparatus in which all of the subassemblies are individually fine tunable, yet cooperative.

SUMMARY OF THE INVENTION

According to the present invention an improved dispensing apparatus is disclosed which realizes the foregoing objects and overcomes the disadvantages of the prior art.

This is accomplished by providing a food dispensing apparatus having a housing which rests on a surface. The housing has a hopper which opens into the housing. Rotatingly mounted inside the housing is a drum having a plurality of spaced, irregularly shaped fins surrounding the periphery of the drum, which retain the food in the spaces between the fins. A fulcrum surface is situated in the spaces between the drum fins and removes material therefrom and allows it to pass over the fulcrum surfaces preferably in a continuous ribbon. A rotating nibbling apparatus breaks off discrete lumps from the food material passing over the fulcrum surface and pushes the lumps over the edge of the fulcrum surface, where they may fall onto the surface below, in waterfall fashion.

Preferably, the fins should form a repeating chevron pattern, and the scraper should have a plurality of notches to correspond with the plurality of fins.

BRIEF DESCRIPTION OF THE DRAWINGS

Other objects, features, and advantages of the present invention will become more fully apparent from the following detailed description of the presently preferred embodiment, the appended claims, and the accompanying drawings in which:

FIG. 1 is a perspective view of the preferred embodiment of the apparatus of the present invention;

FIG. 2 is an end elevational view of the apparatus of FIG. 1;

FIG. 3 is a side elevational view of the drum with some portions broken away and other portions in section to show inside detail;

FIG. 3A is a partial side elevational view of an alternate fin arrangement shown on a reduced scale;

FIG. 4 is an end elevational view of the drum with the hopper location shown;

FIG. 5 is a side elevational view of one chevron shaped fin segment;

FIG. 6 is a top plan view of the fin of FIG. 5, viewed along line 6—6;

FIG. 7 is a side view of the fin of FIG. 6 viewed from the right of FIG. 6;

FIG. 8 is an enlarged detailed view of a portion of FIG. 2;

FIG. 9 is a side elevational view of the nibbler assembly; and

FIG. 10 is a detailed view of the scraper blade assembly showing its relation to the drum.

DETAILED DESCRIPTION OF THE PRESENTLY PREFERRED EMBODIMENTS

Referring now to the drawings, and particularly to FIG. 1, there is shown a perspective view of a preferred embodiment of the meat dispensing apparatus of the present invention, generally designated by the reference numeral 10. Generally, the apparatus 10 has a housing 12 which supports the structure. Located on top of the apparatus is a hopper 14 for feeding particulate food materials, such as cooked, ground hamburger, diced sausage and pepperoni for example, into the apparatus 10. Disposed within the hopper 14 is an agitator 16 which rotates to prevent the meat (not shown) situated in the hopper 14 from becoming too compressed. Egress from the hopper 14 is controlled by an adjustable gate 18 mounted on the housing 12. Situated below the gate 18 and the hopper 14 is a drum 20, against which rests a scraper blade assembly 22. A nibbler 24 is located above the scraper blade assembly 22, while the optional mixer shafts 26, 28 are located in front of but beneath the drum 20. In FIG. 1, the apparatus 10 is shown standing on the side support members 200,202 of a conveyor belt 30.

Still referring to FIG. 1, the housing 12 has a pair of sides 32,34 having numerous holes on each side to hold the various shafts of the subassemblies described above. Each side 32,34, is approximately L-shaped with the trunk section 36,38 of each side 32,34 extending upward, and a pair of bases 40,42 extending horizontally along the side support rails 200,202 of the conveyor belt 30. The housing 12 also has a front portion 44 to which is attached the adjustable gate 18. The adjustable gate 18 is essentially a rectangular piece of sheet metal having a plurality of oval shaped, longitudinally spaced "lost motion" openings 130. The openings 130 fit on several bolts 132 on the front portion 44 of the housing. The adjustable gate 18 is tightened down against the front surface 44 by any conventional fastening mechanism, such as a wing nut 134. The oval shaped opening 130 allows the gate 18 to be moved upward or downward with relation to the drum 20, which enables adjustment of the size of the gate opening, through which food material may leave the hopper 12.

The hopper 14 as seen in FIGS. 1 and 2 is essentially a sloping sheet metal compartment having front and back sides 50,52, as well as left and right sides 204,206. The sides should preferably slope gently towards the central orifice 208 of the hopper 14. These sloping sides help guide the sausage meat or pepperoni toward the hopper's orifice 208, which helps the toppings to feed more evenly onto the drum 20. The slope of the hopper sides 50,52 should be rather gentle, however, in order for there to be a relatively wide orifice 208 disposed at the bottom of the hopper, so that meat can be fed to the drum 20 at a relatively rapid rate. Rapid feed capability enables use of the apparatus 10 in modern, high speed food assembly lines. The actual dimensions of the hopper will vary, of course, depending upon the specific application envisioned.

Disposed within the hopper 14, is one or more hopper agitators 16, as shown in FIG. 1. The agitator 16 is a shaft 54 having a plurality of pins 56 extending therefrom. The shaft 54 is journaled at both ends using stationary bearings, and is driven from one side by its own hydraulically driven motor (not shown). The agitator 16 stirs up the meat in the hopper 14 and prevents it from becoming to densely compressed near the bottom of the hopper 14. Avoiding build-up near the orifice 208 of the hopper helps prevent clogging, and promotes even feeding to the drum 20.

FIG. 1 also illustrates the placement of the pins 56 on the agitator shaft 54. The pins 56 preferably extend perpendicularly with respect to the longitudinal axis of the shaft 54. The pins 56 are preferably spaced around the shaft 54 in a helical pattern as shown in FIG. 1, although they may be situated pin wheel style, for example. Individual pins 56 are spaced apart so that sausage meat or other food materials do not get caught between adjacent pins 56.

The structure of the drum 20 is best understood by referring to FIGS. 1, 2 and 3. As shown in FIG. 3, the drum 20 has a central cylinder 62 which is hollow. The cylinder 62 has two end plates 64,66 each having a central opening 68,70 sized to accept a shaft 72. Disposed in the middle of the drum cylinder 62 is a central drum plate 74. This central drum plate 74 also has a central opening 76. The central drum plate 74 is welded into place around the shaft 72, and supports the hollow drum cylinder 62. The drum cylinder 62 should preferably have an outside diameter of 10 inches, but precise machining is not essential to satisfactory operation. The shaft may be one and one-eighth inch stainless steel rod, machined to one inch at each end to fit the bearings (not shown). Also, there should preferably be a keyway 210 on one side to engage the hydraulically operated motor.

On the outside surface of the drum 62 there is situated a plurality of irregularly shaped fins 78, illustrated here as chevron shaped fins. The fins 78 shape can also be regularly shaped, (spiral), or serpentine 78A, as shown in FIG. 3A. It should be understood, however, that irregularly shaped fins work best with materials such as sausage meat, because they counteract the tendency of the meat to fall off a drum having spiral vanes prematurely. These fins 78 are spaced apart along the length of the drum cylinder 62, as illustrated in FIG. 3. The chevron shaped fins 78 preferably completely encircle the circumference of the drum 20 in what is essentially zig-zag fashion. The fins 78 are spaced apart at a predetermined distance in order to optimize meat flow from the hopper 14, and to optimize cooperation with the scraper blade 22. Preferably, the chevron shaped fins 78 should run parallel to each other and should be spaced approximately 1 and 15/16th inches apart, and there should preferably be 37 of them. The chevron shaped fins 78 help move the meat under the gate 18.

As shown in FIGS. 3 and 6, the fins 78 are made up of numerous individual bands 80 which are assembled by welding the individual bands 80 at predetermined angles and then welding them to the drum exterior 62. The illustrated angle is preferable for pizza applications, but the angle may be adjusted to suit particular needs. Optionally, the drum may be scored to provide grooves (not shown) into which the fins 78 may be fitted. The detailed construction of each band is elucidated by FIGS. 5-7. As shown in FIG. 5, each band which makes up the chevron shaped fins 78 has an arcuate shape. For a ten inch outside diameter drum cylinder 62, each band 80 should preferably have an upper arc of 3¼ inch long, and a 3.023 inch lower arc. Using these dimensions allows the bands 80 to conform to the circumference of the drum cylinder 62.

The preferred embodiment also has a scraper assembly 22 as illustrated in FIGS. 1 and 8. As shown in FIG. 8, the scraper assembly 22 has a scraper blade 82 for removing meat particles between the fins 78 on the drum 20. The scraper blade 82 has a support strip 90 and an attachment arm 84 which connects the scraper blade 82 to a sleeve bearing 86. The sleeve bearing 86 captures a stub shaft 88 at each end (only one end shown), while permitting it to rotate around the axis containing the stub shafts 88. Projecting from the upper portion of the bearing 86 and essentially horizontal with respect to the bearing 86, there is attached a counterweight 92. The counterweight 92 serves to counterbalance the scraper blade 82 so that it is urged against the drum, but does not press too forcefully against the surface of the drum cylinder 62. This protects the drum cylinder 62 surface from gouges or from excess friction. The scraper 82 removes meat from between the chevron shaped fins 78 and allows it to flow down along the upper side of the scraper blade 82 in long ribbon like strips.

As shown in FIG. 10, the scraper blade 82 is essentially rectangular, and has notches 220 corresponding to each fin 78 on the drum 20. The notches 220 allow the fins 78 to turn freely without catching the scraper blade 82. The scraper blade 82 thus acts as a fulcrum surface, prying the meat "ribbon" from the space between the fins 78, and allowing the ribbon to glide over the surface of the blade 82.

The preferred embodiment also preferably includes a nibbler assembly 24, as shown in FIG. 1, and illustrated in more detail in FIGS. 8 and 9. The nibbler assembly 24 is especially useful in sausage applications, but may be omitted in dry food applications, such as with cereal products. The nibbler assembly 24 also includes a shaft 94. The nibbler shaft 94 has three grooves spaced approximately 120 degrees apart around the circumference of the shaft for receiving the nibbler blades, as shown in FIG. 10.

FIG. 9 illustrates the structure of the nibbler blades 96. Each blade 96 has a plurality of teeth 98 interspaced with cutouts 100. The teeth 98 and cutouts 100 alternate on the first blade 102 and third blade 106 as shown in FIG. 9 so that a tooth 98 on the first blade 102 aligns with a cutout 100 on the third blade. The second blade 104 is in effect one-half period out of phase with the first blade 102. That is, the second blade 104 preferably begins with half a cutout 100, so that half a cutout 100 and half a tooth 98 align with every tooth 98 on the first blade 102. This alternating tooth structure allows build up of small amounts of meat between sweeps by the teeth 98 as they rotate around and nibble off a portion of meat with each revolution. This helps achieve meat lumps of fairly uniform size and weight, assuming fairly consistent feed.

Preferably, each tooth 98 is one inch wide, should extend approximately 9/16 inch beyond the adjacent cutout 100. The cutouts 100 should be 5/16 inch deep, and the grooves 95 on the shaft should be approximately 1/16 of an inch so that the cutouts 100 project ½ inch. Also, each cutout 100 should be an inch wide as well. The nibbler blades 96 are placed in the groove 95 and welded into rigid position.

Optionally, for some applications, the dispenser apparatus 10 may include a mixer assembly 26. As may be seen in FIG. 1, this mixer assembly 26 utilizes a pair of shafts 108,110. Each shaft has protruding therefrom a plurality of spaced tines 112 extending perpendicularly from the shafts 108,110. As may be seen in FIG. 2, the first shaft 108 preferably has three sets of tines 112 placed 60 degrees apart around the circumference of the shaft 108. The second shaft 110 preferably has one or more rows of tines 112 placed perpendicularly on the second shaft 110. This allows the tines 112 to intermesh as the two shafts 108,110 of the mixer apparatus 26 are turned in opposite directions. This mixer apparatus 26 is useful for breaking up lumps of food materials where they are not desired, but likely to form as, for example, in pizzas having diced pepperoni toppings. This helps separate the diced pepperoni chunks evenly over the crust.

The assembly of the preferred embodiment of the present invention is best understood by reference to FIGS. 1 and 2. As shown in those figures, the agitator 16 is disposed horizontally within hopper 14. The hopper feeds into the drum 20. It is turned constantly when the machine operates to keep the meat moving evenly through the gate 18 and onto the drum 20. The amount of material as well as the size of individual particles is controlled by the adjustable gate 18. For example, where larger chunks are desired, or where larger discrete elements are used such as with mushrooms or diced pepperoni, the gate 18 may be adjusted to leave a larger opening between its edge and the drum 20. The weight of the material in the hopper 14 causes the lowermost particles to fill the interstices between the chevron shaped fins 78. An even and continuous strip or ribbon (not shown) is formed between two adjacent fins 78, which strip is peeled from the drum surface by one segment of the scraper blade 22.

The drum 20 is assembled by taking a properly machined shaft 72, whose dimensions will be discussed below, and inserting it into the drum cylinder 62. Next the central plate 74 slid into place on the shaft 72 inside the cylinder 62 and welded using conventional welding methods. Next, an end plate 64,66 is placed on either side of the cylinder 62, and also welded in place around the periphery of the drum, and along the shaft 72.

Because the drum 20 has chevron shaped fins 78 as opposed to spiral shaped fins, a pair of cams 114 are used to guide the scraper blade assembly 22 to keep it aligned with the chevron fin 78 configuration, as illustrated in FIGS. 8 and 10. The cams 114 are preferably identical, and are situated on opposite sides of the scraper blade assembly 22. Each cam 114 includes an arm 116 and a follower pin 118. The scraper cam 114 on the left side of the apparatus 10 coacts with the scraper cam 114 on the right side of the apparatus 10 in the following manner: when the drum is turning counter-clockwise, the outermost fin 78 on the far side of the housing 12 is angling outward or inward with respect to the housing. As the outermost fin 78 on the far side is angling outward, it pushes the follower cam 114 outward also, which moves the scraper blade assembly 22 in the same direction. When the outermost fin 78 is moving inward, it disengages from the follower cam 114, but the outermost fin 78 on the opposite end of the drum is moving outward and begins pushing the adjacent follower cam 114. Thus, the follower cam 114 on the opposite end of the drum is moved outward and pulls the scraper blade assembly 22 in that direction. In this way, the scraper blade assembly 22 is shuttled back and forth in reciprocating fashion so that the notches can follow the chevron shaped fins 78.

As mentioned above, the scraper blade assembly 22 strips a continuous ribbon of meat from between the fins 78 on the drum 20. The nibbler assembly 24 then nibbles off discrete clumps of meat which fall in waterfall fashion onto the crust below. The nibbler 24 thus acts as a recirculating scoop which bites off a lump of meat, and pushes it or carries the lump along the scraper surface 82, until it has enough momentum to continue movement off the edge of the scraper 82 and falls onto the surface below. The crust, meanwhile, is moved by rather rapidly on a conveyor belt 30, and catches the falling lumps as it goes by. The meat is in this way evenly distributed on the crust surface by the waterfall of meat lumps. If the mixer apparatus 26 is used, the lumps of food material which are nibbled off by the nibbling apparatus 24 are first caught by the intermeshed tines 112 of the mixer 26 and then tossed back into the air, which breaks apart any chunks which are stuck together. In this way, diced and chunked food materials are separated again so that they will also be evenly distributed.

Preferably, the entire apparatus can be fashioned of stainless steel to provide a sanitary surface. Alternatively, the surfaces which contact food may be Teflon coated to prevent food particles from sticking to the surfaces. The scraper blade 82 may preferably be made of a high density polyethylene material. This blade may be screwed onto the metal support apparatus, or attached in any other well known and conventional matter. A plastic blade has the advantage of being soft and pliable so that it performs its scraping function quite well, without damaging the surface of the drum. Also, the meat scraped off the drum will flow relatively easily across the upper surface of the plastic blade.

It should by now be apparent to those skilled in the art that a dispensing apparatus has been disclosed which provides numerous unique features and advantages. One advantage of the present apparatus is that it enables quite accurate dispensing of meat onto pizza surface without having to weigh the meat. This is accomplished by adjusting the speed of the various elements of the apparatus so that the right amount of meat is deposited on the crust as it passes by on a conveyor 30. Another important feature of this apparatus is the adjustable gate 18 which may be raised or lowered to increase the amount of material that is emptied from the hopper or to allow larger size materials to be dispensed by the apparatus.

A further advantage is that the dispensing apparatus gives uniform distribution of materials across the surface on which the materials are distributed. Yet another advantage is that the individual motor controls enable a wide variety of adjustments to be made for various conditions and foods. Further, the optional mixing apparatus helps break up clumps where they are not wanted. Yet another advantage is provided by the agitator 16 which prevents food material from building up too heavily in the hopper and keeps it flowing smoothly from the hopper.

The nibbler 24 bites off properly sized chunks and scrapes the chunks off the blade 82. Another important feature is that the shape of the fins may be adjusted to hold nonsticky foods better, as to allow minimal retention of sticky foods. For example, serpentine or spiral fins may be substituted for chevron shaped fins. Still another advantage derives from the overall design which allows easy access to all parts for repairs, easy replacement of parts and ready access to motorized parts which may be more likely a break down. The housing provides yet another advantage in that it may be fitted with protective facings so that assembly line workers are protected from injury.

While the apparatus described herein is presently considered to be the preferred embodiment, it should be understood that various modifications and improvements may be made. For example, the apparatus may be adapted for use in many different areas of food technology. For example, it may be used to distribute cheese or bacon bits in quiches or pizzas. Also, it may be adapted for various different assembly lines. In addition, the hopper may be made out of Lucite or some other transparent plastic to enable an operator to see when to refill it. Such modifications and improvements will occur to those skilled in the art and it is therefore intended to cover in the appended claims all such modifications and improvements as fall within the true spirit and scope of the invention.

We claim:
1. An apparatus for uniformly dispensing particulate food materials onto a moving article comprising:
    (a) hopper means for holding a supply of the particulate material;
    (b) said hopper means having a horizontally-disposed orifice through which particulate material may exit;
    (c) a drum mounted adjacent and below said orifice and rotatable on an axis;
    (d) a plurality of spaced fins protruding radially from the surface of said drum and terminating in ends a predetermined distance from the surface of the drum, said fins being disposed on a zigzag pattern relative to the length of said drum and operable to counteract the tendency of the particulate material to fall off the drum;
    (e) rotation of said drum in one direction causing particulate material which has compacted on the drum surface between said fins under the force of gravity to be rotated transversely of said opening and out of said hopper; and
    (f) scraper means extending parallel to the drum surface below said orifice and adapted to engage said drum surface between said fins;
    (g) said scraper means being operable to follow the zigzag pattern of said fins and to shift longitudinally of said drum during rotation thereof and effective to lift particulate material compacted in ribbons between said fins off of said surface and guide it to a discharge precipice over which it falls onto the moving article.

2. The dispensing apparatus of claim 1 further characterized by and including:
    (a) gate means disposed on one of said edges;
    (b) said gate means being adjustable toward and away from said fin ends to vary the thickness of said ribbons.

3. The dispensing apparatus of claim 1 further characterized by and including:
    (a) nibbler means extending parallel to said scraper means above said scraper means;
    (b) said nibbler means including nibbler vanes which rotate in the direction of particulate material movement on said scraper means and are effective to segment said ribbons of particulate material before they reach said precipice.

4. The dispensing apparatus of claim 3 further characterized in that:
    (a) said nibbler means comprises a plurality of nibbler teeth arranged in a radial pattern;
    (b) said nibbler teeth being irregularly positioned so that rotation of said nibbler means causes alternating teeth to engage ribbons of compacted particulate material and segment said material.

5. The dispensing apparatus of claim 1 further characterized in that:
    (a) said scraper means is notched to cooperate with said fins.

6. The dispensing apparatus of claim 5 further characterized in that:
    (a) said scraper means includes cam means cooperable with said fins and operable to follow the contour of said fins as said drum rotates and to slide said scraper means in a direction parallel to said drum surface.

7. The dispensing apparatus of claim 1 further characterized in that:

(a) said fins are substantially evenly spaced along the length of said drum;
(b) said fins extending parallel to each other in a chevron pattern as they encircle said drum.

8. The dispensing apparatus of claim 7 further characterized in that:

(a) said scraper means has a plurality of notches thereon to cooperate with said evenly spaced fins;
(b) said scraper means being mounted for movement parallel to the axis of said drum whereby said scraper means follows said fins as said drum rotates.

* * * * *